US006560707B2

(12) United States Patent
Curtis et al.

(10) Patent No.: US 6,560,707 B2
(45) Date of Patent: *May 6, 2003

(54) MULTIMEDIA COORDINATION SYSTEM

(75) Inventors: Pavel Curtis, Los Altos Hills, CA (US); Michael D. Dixon, Palo Alto, CA (US); Ronald A. Frederick, Mountain View, CA (US); David A. Nichols, Mountain View, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/586,136

(22) Filed: Jan. 12, 1996

(65) Prior Publication Data

US 2003/0051136 A1 Mar. 13, 2003

Related U.S. Application Data

(60) Provisional application No. 60/007,262, filed on Nov. 6, 1995.

(51) Int. Cl.[7] .................................................. H04L 9/00
(52) U.S. Cl. .................... 713/163; 713/171; 380/33; 380/257; 380/281
(58) Field of Search .......................... 380/33, 257, 281; 713/171, 163; 395/330, 200.01

(56) References Cited

U.S. PATENT DOCUMENTS

| | | | | |
|---|---|---|---|---|
| 4,649,233 A | * | 3/1987 | Bass et al. ................... | 713/171 |
| 4,920,565 A | * | 4/1990 | Strawczynski et al. ..... | 380/257 |
| 5,003,593 A | * | 3/1991 | Mihm, Jr. .................... | 713/156 |
| 5,008,853 A | | 4/1991 | Bly et al. .................... | 364/900 |

(List continued on next page.)

FOREIGN PATENT DOCUMENTS

WO    WO 94/24807    10/1994

OTHER PUBLICATIONS

European Search Report for EPO counterpart Application No. EP 96 30 8040 Sep. 22, 1999.
Hill et al., "The Rendezvous Language and Architecture," Communications of the ACM, Jan., 1993, vol. 36, No. 1.

(List continued on next page.)

*Primary Examiner*—Gilberto Barrón
*Assistant Examiner*—Paul Callahan

(57) ABSTRACT

In a network, a media coordination system provides secure multimedia communication channels in a collaborative network environment. The media coordination system provides automatic encryption, dynamic interconnection of streams of data, and user interface elements that provide users with control over the ultimate destination of their audio and video data. The infrastructure of the system includes a plurality of client workstations that are connected to a central server using point-to-point network connections. The central server maintains a persistent virtual world of network places with objects located therein. Streams of audio and video data are coordinated between client workstations operating in the persistent virtual world by a key manager object using channels, transmitters, and receivers. The client workstations multicast their audio and video data over the network to defined recipients after receiving a multicast address and an encryption key for a specific multicast channel. In order to protect the privacy of all communications and the integrity of the coordination system, each client workstation retains significant control over distribution and reception of audio and video data since multicast transmission is tied to specific user interface elements. The multimedia user interface elements include cameras, speakers, microphones, and video panes. Since the central server only coordinates where audio and video data is broadcast for a particular interface element, each client workstation ultimately controls the destination of multimedia data through selection of the element at the user interface.

21 Claims, 9 Drawing Sheets

U.S. PATENT DOCUMENTS

| | | | | |
|---|---|---|---|---|
| 5,072,412 A | | 12/1991 | Henderson, Jr. et al. | 395/159 |
| 5,107,443 A | | 4/1992 | Smith et al. | 395/158 |
| 5,208,912 A | | 5/1993 | Nakayama et al. | 395/200 |
| 5,210,794 A | * | 5/1993 | Brunsgard | 380/257 |
| 5,353,351 A | * | 10/1994 | Bartoli et al. | 380/33 |
| 5,410,602 A | * | 4/1995 | Finkelstein et al. | 380/281 |
| 5,473,605 A | * | 12/1995 | Grube et al. | 340/7.46 |
| 6,002,768 A | * | 12/1999 | Albanese et al. | 713/175 |

OTHER PUBLICATIONS

Curtis et al., "MUDs Grow Up: Social Virtual Reality in the Real World," Proceedings of the 1994 IEEE Computer Conference, pp 193–200, Jan. 1994.

Zellweger et al., "An Overview of the Etherphone System and its Applications," Proceedings of the 2nd IEEE Conference on Computer Workstations, Mar. 1988.

Bellcore Information Networking Research Laboratory, "The Touring Machine System," Communications of the ACM, Jan. 1993, vol. 36, No. 1.

Pioch et al., "A Short IRC Primer," Feb. 28, 1993 (available by FTP at cs.bu.edu/irc/support).

Deering et al., "Multicast routing in datagram networks and extended LANs," ACM Transactions on Computer Systems, May 1990.

Schulzrinne et al., "RTP: A Transport Protocol for Real–Time Applications," IETF Internet Draft (available from ftp://ftp.internic.net/internet–drafts/draft–ietf–avt–rtp–07.txt).

Hickman, K.E.B., "The SSL Protocol" (available from http://home.mcom.com/newsref/std/SSL.html).

Curtis et al., LambdaMOO Programmmer's Manual (available as ftp://ftp.parc.xerox.com/pub/MOO/Programmers-Manual.ps).

Fish et al., "Video as a Technology for Informal Communication," Communications of the ACM, Jan., 1993, vol. 36, No. 1.

Curtis, P., "Mudding: Social Phenomena in Text–Based Virtual Realities," May 1992 conference on Directions and Implications of Advanced Computing, sponsored by Computer professionals for Social Responsibility, Berkeley, CA.

* cited by examiner

MULTIMEDIA COORDINATION SYSTEM

Priority is claimed from a U.S. provisional application No. 60/007,262 filed Nov. 6, 1995 by the same inventors and assignee.

The present invention relates to a system for providing secure multimedia communication between a plurality of network users, and in particular to a central multimedia coordination system that supports different levels of secure communications between the plurality of network clients.

BACKGROUND OF THE INVENTION

As network connectivity increases, network users will gain productivity by using collaborative applications or workspaces that exchange audio and video transmissions. Network protocols that integrate devices such as printers, scanners, and workstations over a network are well known. Operational transparency across physical networks and different device platforms provides users with increasingly integrated and transparent system environments for increased collaboration. Physical networks include telephone lines, twisted pair wires, coaxial cables, microwaves, infrared, and/or other data links. Device platforms include centralized computer systems or distributed client-server computer systems.

By way of background, system user interfaces operating on device platforms are disclosed in U.S. Pat. Nos. 5,072,412 and 5,107,443. Specifically, these patents relate to workspaces having an object-based user interface that appears to share windows and other display objects. Also of interest is U.S. Pat. No. 5,008,853 disclosing shared structured data by multiple users across a network. In such systems, a display system object can be linked to several workspaces giving workspaces the appearance of shared windows. These workspaces can be navigated through using metaphors such as moving from one room to another through doors. Additionally, these workspaces can be shared by groups of users over a network. Groupware systems that provide toolkits for building specific shared applications such as text editors or drawing editors are disclosed by Hill et al. in "The Rendezvous Language and Architecture," Communications of the ACM, January, 1993, Vol. 36, No. 1.

An example of a collaborative system is a game known as "Multi-User Dungeons" (MUDs) which is disclosed by Curtis et al. in "Mudding: Social Phenomena in Text-Based Virtual Realities," Proceedings of the 1992 Conference on Directions and Implications of Advanced Computing, Berkeley, May 1992, and by Curtis et al. in "MUDs Grow Up: Social Virtual Reality in the Real World," Proceedings of the 1994 IEEE Computer Conference, pp. 193–200, January 1994, the background of which is incorporated herein by reference. MUDs are programs that accept network connections from multiple users simultaneously while providing access to a shared text-based database of virtual "rooms", "exits", and other objects. Network users browse and manipulate the database from inside the rooms, seeing only those objects that are in the same rooms or moving between rooms via exits that connect them. MUDs, therefore, provide a virtual reality of electronically-represented "places" or "network places" that users can visit. The popularity of MUDs is believed to exist because of the social quality of the system and the richness of the metaphor the system employs. In effect, the system makes use of the company of other people while using intuitive and appealing real life metaphors.

Collaborative systems integrating audio and video data are known. A manner in which a phone system can be connected to a virtual system on a network is disclosed by Zellweger et al. in "An Overview of the Etherphone System and its Applications," Proceedings of the 2nd IEEE Conference on Computer Workstations, March 1988. Specifically, Zellweger et al. discloses the concept of using encryption keys that are administered by a server. The concept of a server managing the connection state is disclosed by the Bellcore Information Networking Research Laboratory in "The Touring Machine System," Communications of the ACM, January 1993, Vol. 36, No. 1. The AT&T Globalyst™ 630 Vistium™ shared software and personal video software permits up to six people in different locations to collaborate on the same document at the same time while video conferencing. A system that integrates text at different levels is known as "Internet Relay Chat" (IRC), as disclosed by Pioch et al. in "A Short IRC Primer", Feb. 28, 1993 (available by FTP at cs.bu.edu/irc/support). IRC is a text-based multi-user, multi-channel, client-server program that enables both public and private text-based conversations over a network.

The aforementioned systems, however, do not provide facilities for controlling the distribution and recording of real-time audio and video streams while simultaneously providing users with an understanding and control over the destination of their audio and video streams. Accordingly it would be desirable to provide a collaborative environment that integrates shared and persistent objects over long periods of time through the use of "network places". Each "network place" provides users with the flexibility to control the extent of their participation with other users. It is an object of the present invention, therefore, to provide an integrated system with audio and video data that supports long-term collaboration between network users. It is another object of the present invention that the audio and video data shared between users is secure. It is yet another object of the invention to provide different levels of communication between users.

In addition, the collaborative environment embodying the present invention, similar to the rooms environment in MUDs, is not grounded in the physical world. The present invention uses metaphors such as virtual rooms to offer clues about the kind of behavior that is appropriate in a particular room. Specifically, different virtual rooms define different social protocols. For example, discussions in a conference room are more formal than discussions taking place in a lounge. In addition, the present invention expands the room metaphor to include virtual fax machines, tape recorders, and messaging systems. The present invention is also directed at a collaborative environment in which users are not able to access each other at will. For example, each user provides information to other users to indicate whether each user can be interrupted. In effect, communication using audio and video data is advantageously used in the collaborative environment to increase productivity between network users in the collaborative environment.

SUMMARY OF THE INVENTION

In accordance with one aspect of the invention, there is provided a method for dynamically controlling multiple channels of data in a multi-user collaborative system having a central server connected to a plurality of client workstations over a network. The method includes the steps of: displaying at each client workstation a view on a room object stored in an object database on the central server, the room object being associated with a first channel stored in the object database; providing, at each client workstation, visual identification of each user object located in a virtual room, each pair of user objects located in the virtual room having associated therewith a whisper channel: initiating, at a first client workstation, broadcast of data to each user object located in the virtual room by selecting a first interface element displayed at the first client workstation, the first interface element being associated with the room object and directing data to the first channel; and interrupting, at the first client workstation, broadcast of data transmitted over the first channel by selecting a second interface element displayed at the first client workstation, the second interface element being associated with a user object at a second client workstation, the interrupting step initiating broadcast of data at the first client workstation to the whisper channel associated with the user object at the second client workstation.

In accordance with another aspect of the invention, there is provided in a network interconnecting a central server and a plurality of client workstations adapted to sending and receiving data, a method for coordinating communication of data between each of the plurality of client workstations. The method includes the steps of associating a first client workstation with a device, the device providing multimedia input at the first client workstation; defining a first transmitter in a memory of the central server for transmitting data from the device over a first channel; defining a first receiver in the memory of the central server for receiving audio signals over the first channel at a second client workstation; providing a first encryption key to the first client workstation and the second client workstation to provide secure communication of data over the first channel; defining, subsequent to the providing step, a second receiver in the memory of the server for receiving audio signals over the first channel at a third client workstation; and altering, in response to the defining step, the first encryption key provided to the first client workstation and the second client workstation, the altering step providing a second encryption key to the first client workstation, the second client workstation, and the third client workstation for communication of data over the first channel so that communication broadcast over the fast channel is secure.

In accordance with yet another aspect of the invention, there is provided a method of coordinating multicast audio data between a plurality of client workstations connected over a network, each client workstation having a point to point connection with a central server. The method includes the steps of displaying a communicator at a client workstation, the communicator providing a first user interface element to direct audio data from an audio device at the client workstation to a first set of client workstations and a second user interface element to direct audio data from the audio device to a second set of client workstations, the second set of client workstations being a sub-set of the first set of client workstations; defining, in a memory of the central server, a public channel for transmission of audio data to the first set of client workstations and a private channel for transmission of audio data to the second set of client workstations; receiving, at the central server, a first user signal from the communicator at the client workstation to direct audio data from the audio device to the public channel; providing with the central server, in response to the first user signal, a first encryption key to the client workstation, the first encryption key enabling transmission of audio data between the client workstation and the first set of client workstations over the public channel; receiving, at the central server, a second user signal from the communicator at the client workstation to direct audio data from the audio device to the private channel; providing with the central server, in response to the second user signal, a second encryption key to the client workstation, the second encryption key enabling transmission of audio data between the client workstation and the second set of client workstations over the private channel; and toggling, at the client workstation, between the first encryption key and the second encryption key in response to a third user signal from the communicator to terminate transmission of audio data from the audio device to the private channel and the second user signal, the toggling step being performed without the client workstation communicating with the central server so that the client workstation minimizes latency perceived at the communicator by reducing communication between the client workstation and the central server.

In accordance with a further aspect of the invention, there is provided in a network interconnecting a central server with a memory and a plurality of client workstations adapted to broadcasting data, a system for coordinating communication of data between each of the plurality of client workstations. A device receives data at a first client workstation. A first transmitter coordinates transmission of data from the device over a channel, the first transmitter being stored in the memory of the central server. A first receiver coordinates receipt of data over the channel at a second client workstation, the first receiver being stored in the memory of the central server. Means provide a first encryption key to the first client workstation and the second client workstation for secure broadcast of data over the channel. Means provide a second encryption key to the first client workstation and the second client workstation in response to a third client workstation storing in the memory of the central server a second receiver for coordinating receipt of data over the channel at the third client workstation, the providing means ensuring secure broadcast of data over the channel to the first client workstation, the second client workstation, and the third client workstation.

In accordance with yet another aspect of the invention, there is provided in a networked computing environment interconnecting a plurality of client workstations and a central server, the plurality of client workstations communicating directly with the central server, each of the plurality of client workstations broadcasting data to sets of the plurality of client workstations, a coordination system for providing dynamic interconnection of streams of data between each of the plurality of client workstations. An object database, resident in a memory of the central server, for storing a plurality of database objects, the object database having stored therein a room object with a channel associated therewith. A first user object being stored in the object database and having associated therewith a first client workstation, the first user object having a device for providing multimedia input at the first client workstation, the device directing multimedia input to a transmitter aiming at the channel. A second user object being stored in the object database and having associated therewith a second client workstation, the second user object having a receiver directed at the channel for receiving data broadcast over the channel. A key manager object being stored in the object database and communicating with the first user object and the second user object, the key manager providing coordination information to enable the first user object and the second user object to broadcast data between the first client workstation and the second client workstation over the channel.

BRIEF DESCRIPTION OF THE DRAWINGS

These and other aspects of the invention will become apparent from the following descriptions to illustrate a preferred embodiment of the invention read in conjunction with the accompanying drawings wherein the same reference numerals have been applied to like parts and in which.

DETAILED DESCRIPTION

A. System Architecture

Figure 1:
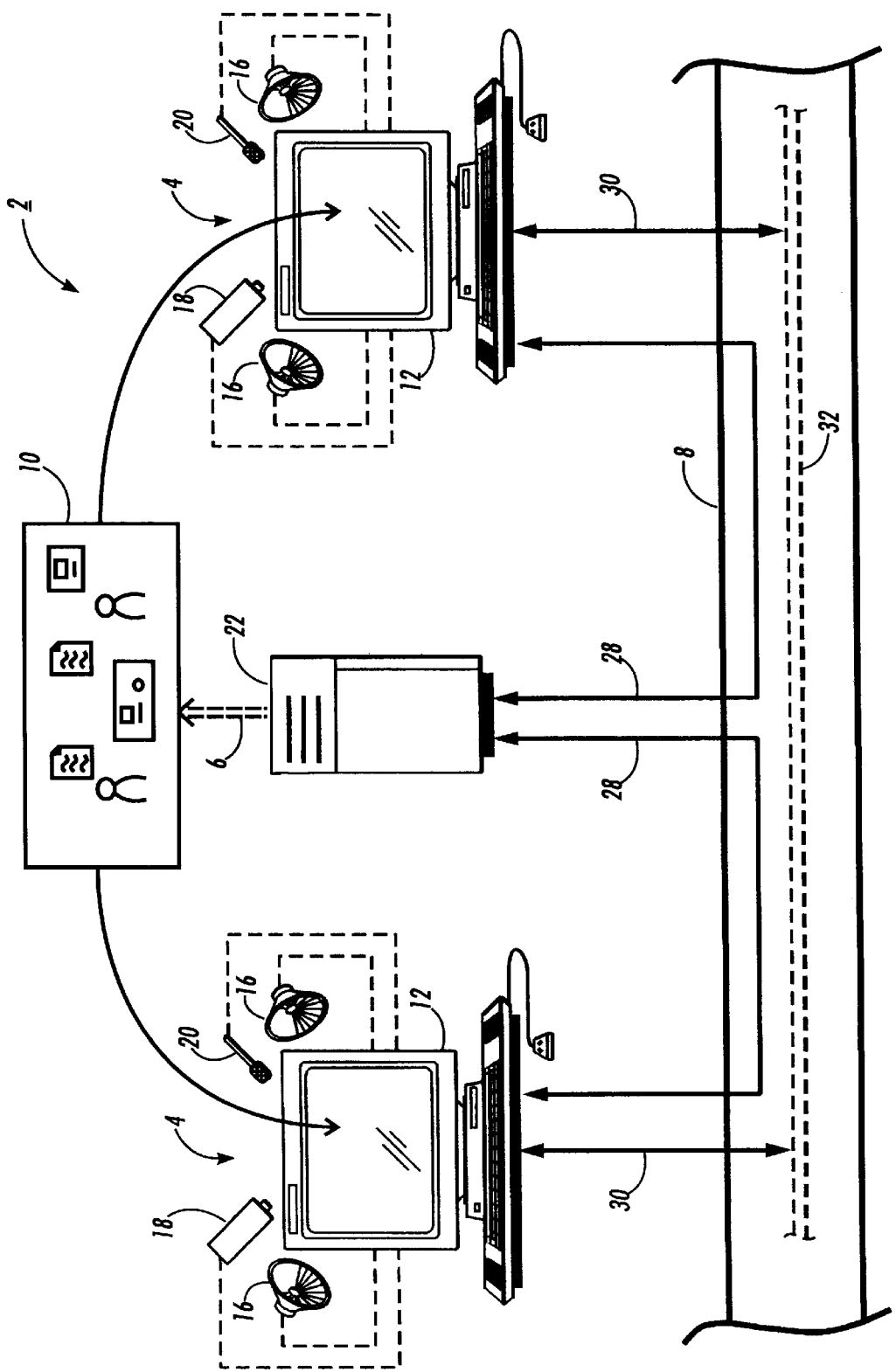
FIG. 1 is an overview of a multimedia system incorporating the present invention.

Referring now to the drawings where the showings are for the purpose of describing the preferred embodiment of the invention and not for limiting same, a general block diagram of a multimedia system 2 incorporating the present invention is shown in FIG. 1. The term "multimedia" is defined herein as data that is relayed using text, graphics, audio, or video. The multimedia system 2 includes a plurality of client workstations (or clients) 4, and a central server (or server) 22 that are interconnected over a physical network 8. The multimedia system 2 provides a virtual persistent collaborative environment 10, which is presented through a communicator window or the like, that enables workstation users to visually and audibly communicate with each other in real time over long distances. The collaborative environment 10 is displayed on display terminals 12 of client workstations 4. Client workstations 4 receive and transmit audio and video data over multicast connections 30 and 32 so that workstation user are able to communicate in the collaborative environment 10. The persistence of the collaborative environment 10 is maintained by server 22 as indicated generally by arrow 6. In addition to display terminals 12, the multimedia system has integrated therein speakers 16, video cameras 18, and microphones 20 at each client workstation 4.

Each client workstation 4 is connected over physical network 8 to central server 22 using a point-to-point networking transmission control protocol (TCP), as indicated generally by connections 28. Communication between the client workstations 4 and central server 22 include typed commands from a user, control instructions from the central server to a client workstation, and status notification from a client workstation to the central server. Audio and video (A/V) data, however, is not delivered between network client workstations 4 using point-to-point network connections because A/V data is typically intended to be received by one or more network users. Instead, A/V data is efficiently "multicast" directly to network 8 by each client workstation as depicted generally by connections 30 to multicast connection or destination address 32. Client workstations 4 transmit and receive A/V data using Internet Protocol (IP) multicast and a proposed Real-time Transport Protocol (RTP). For privacy all A/V data is encrypted. IP multicast is further described by Deering et al. in "Multicast routing in datagram networks and extended LANs," ACM Transactions on Computer Systems, May 1990, the pertinent portions of which are incorporated herein by reference. RTP is disclosed by Schulzrinne et al. in "RTP: A Transport Protocol for Real-Time Applications," IETF Internet Draft (available from ftp://ftp.internic.net/internet-drafts/draft-ietf-avt-rtp-07.txt), the pertinent portions of which are incorporated herein by reference.

A multicast routing protocol enables an individual packet to be received by many clients who have expressed an interest in the packet's specific destination address without duplicating the packet on any link. In general, a sender of such a packet is not able to control which clients are allowed to receive the packet or even discover, after the fact, which clients did receive it. By way of analogy, "multicast" transmission over network 8 is analogous to broadcasts performed using a radio transmitter. For example, each client 4 multicasts on a separate "address," which is analogous to a radio frequency, as explicitly directed by central server 22. Since the central server 22 controls the address (or frequency) of a client wanting to receive a transmission, the central server is able to direct when each client is to "listen" in order to receive A/V data from other client workstations. Multicasting A/V data relieves the central server 22 from the task of managing large amounts of audio and video data, thereby enabling the central server 22 to manage the multicast sending and receiving addresses of client workstations.

Figure 2:
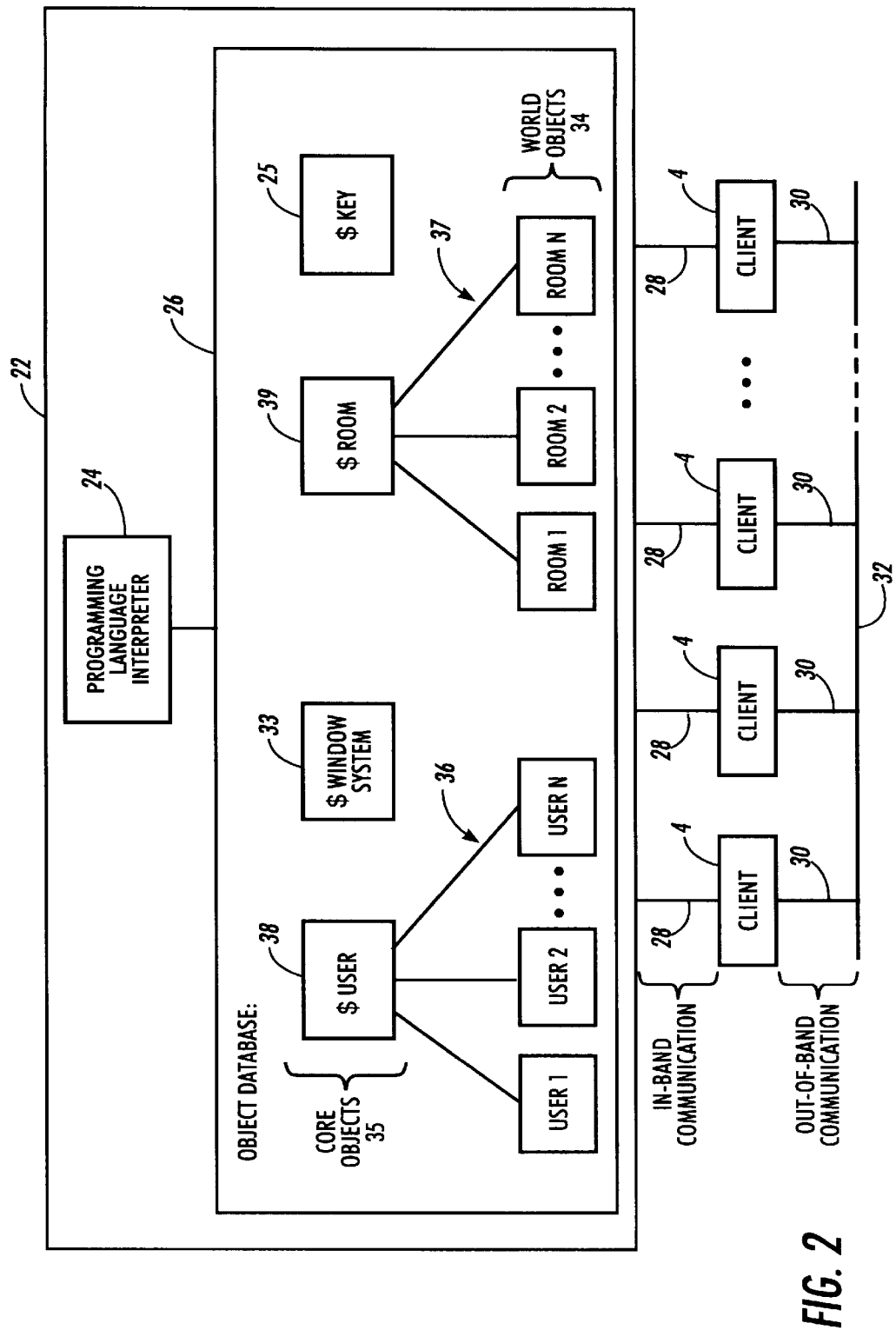
FIG. 2 is a detailed block diagram of the central server and client workstations shown in FIG. 1.

FIG. 2 is a detailed block diagram representation of central server 22 connected to a plurality of clients 4 (or client programs) with TCP connections 28. Central server 22 includes a programming language interpreter 24 and an object database 26. Each client 4 initiates a TCP connection 28 with server 22 which accepts and manages network connections from each client 4. The TCP connection 28 is essentially the only means of communication between client 4 and server 22. All communication on TCP connections 28 is encrypted for privacy, using the proposed Secure Sockets Layer protocol (SSL) as disclosed by Hickman in "The SSL Protocol" (available from http://home.mcom.com/newsref/std/SSL.html). In addition, the server 22 maintains the object-oriented database 26, and executes code stored in the database using interpreter 24, often in response to user commands and client protocol messages. As indicated above, the central server 22 never transmits or receives multicast data. However, central to the management of client multicast transmissions, the key manager 25, which is described in detail later, coordinates multicast data between clients 4 over multicast connections depicted generally by reference numerals 30 and 32.

Virtual objects, whether core objects 35 or world objects 34, are the basic storage unit of server 22. The server database 24 contains states and descriptions of virtual objects such as places, and tools operating in the multimedia system 2. Virtual objects are described using methods and instance variables. Examples of virtual objects include simple text documents and drawing surfaces, general tools like web browsers and tape recorders, tools designed for specific work such as data analysis, and agents that interact with other objects and users. Some of these objects are "world objects" 34 which are virtually tangible, user-visible objects like places, the things in those places, and individual users. For example, two classes of world objects include:

objects modeling individual users (which are defined as "user objects") and objects modeling rooms (which are defined as "room objects"), which are indicated generally by reference numbers 36 and 37, respectively. Certain "core objects" 35 implement very general facilities that are maintained by a system administrator. For example, core objects 35 include the server side of the user interface window system 33, core room object 39, and core user object 38. Each user object 36 and room object 37 are linked to core user object 38 or core room object 39, respectively. Objects that are not core objects are objects such as room objects or user objects, or "applications" (e.g. tape recorder).

Programs written in the server's embedded programming language called "MOO" are interpreted by interpreter 24. The MOO language is disclosed by Curtis in "LambdaMOO Programmer's Manual (available as ftp://ftp.parc.xerox.com/pub/MOO/ProgrammersManual.ps). Users invoke a MOO program each time a command is entered at server 22. In addition, the server 22 includes tools for creating new objects, and new places, and tools for modifying the behavior of objects and places. All aspects of the server database 26 are mutable during execution; objects may be created or destroyed, methods and instance variables added, modified, or removed. As a security measure, each MOO object, method, and instance variable is owned by a specified user and has access control settings. Users and the code they may own, may not, in general, modify or destroy, or in some cases inspect objects, methods, or instance variables owned by other users.

Programs running on clients 4 are primarily responsible for managing the local details of their user interface operating on display terminals 12 (shown in FIG. 1). Guided mostly by commands from the server 22, a client 4 displays windows on a user's display terminal conveys information about the user back to the server, and sends and receives multicast audio and video data. The client employs no knowledge about network places, their contents, their behavior, or even other users. A communication protocol between the client and server is defined at a relatively high-level and a relatively low-bandwidth so that the response time of user actions is minimized. Perceived latency of server requests is minimized using a client-server protocol that is defined using widgets and user events. Widgets are high-level descriptions of interface elements that provide building blocks to windows. For examples, widgets can be user interface elements such as sliders, buttons, etc. The server code sends clients descriptions of the names and layout of user-interface widgets. Clients interpret these high-level descriptions and create corresponding windows on a user's screen display. Low-level interactions, such as scrolling text or echoing typed characters, are typically handled by the client and are not reported to the server. Windows are described to the clients as a tree of high-level widgets. For example, a window is described using a hierarchy of horizontal and vertical boxes containing slider widgets and button widgets. Widgets inform the central server of high-level user actions at client workstations. Widgets are implemented at each client workstation in terms of native facilities on platforms such as UNIX systems and PC's. All widgets in a client's window system have their implementation split between core objects 35 in database 26 and code operating on each client workstation 4. Code operating at the central server 22 is responsible for system coordination and client communications. The server runs "applications" which make requests of a client and respond to events reported by the client. Code operating at a client 4 is responsible for interacting with a user, and for communications with the central server 22.

B. Efficiency and Security Requirements

The communication coordination system 25 incorporates efficiency and security requirements that assure users A/V data is broadcast only when and where necessary. A first efficiency requirement mandates that the same multicast address is not used for multiple transmissions to different sets of receivers. This requirement insures that a receiver who is in one set and not in another set of receivers is not sent data that it is not interested in receiving. A first security requirement that assure users control over where their A/V data is being broadcast at any particular instant in time, mandates that the identical A/V data encryption key is not used for two transmissions with different sets of intended participants. This first security requirement applies even to incremental changes, such as the growing or shrinking of a set by a single member. When a set grows an old encryption key cannot be revealed to a new member of a set because the new member may have recorded old transmissions that were not meant to be received. When a set shrinks, an encryption key must again change in order to keep a member removed from a set from deciphering any further transmission. This insures that a user object which could otherwise receive multicast A/V data would not be able to decrypt it unless other user objects which are in a room object in which the user is not currently located are aware that the user object has entered the room object.

More specifically, the first security requirement is necessary so that users who appear to be alone in the same virtual room or network place know that no other user is eavesdropping on their audio or video communications. Since multicasting operates in a similar manner to radio broadcasting, a user is able to "listen-in" on multicast A/V data even if that user is not intended or entitled to receive the data, or is remote from a sender or the sender's intended recipients. Consequently, the communication coordination system arranges that every audio and video transmission is encrypted with a unique key. In addition, the coordination system only divulges the keys to those clients who are intended receivers of a particular transmission of A/V data.

For example, if users A, B, and C are virtually in a room object together server 22 first provide A's client with a unique sending encryption key K. Subsequently, A's client encrypts all of its audio and video data using key K. Since key K is revealed by server 22 to B's and C's clients, B and C are the only clients outside of A who are able to properly decode A's data transmissions. In a similar manner, B and C receive unique sending keys K from server 22 which are revealed to other clients in the same room object as them. Because of the first security requirement, each key does not last for a long period of time. In this example, if C exited the room object C occupied with A and B, server 22 would issue new sending keys for A and B so that C would not be able to decode what A and B were sending. Similarly, if user D entered a room object occupied by users A, B, and C, to prevent D from decoding transmission data that was previously broadcast by A, B, and C, server 22 would issue new sending keys to all those users in the room object as soon as D entered the room object, namely A, B, C, and D.

Encrypting all A/V data that is multicast to network 8 is not sufficient to ensure the privacy of A/V communication between users. Further encryption of TCP connections 28 between clients 4 and server 22 is required, since all key data is sent between client and server along those connections. Even though TCP connections are point to point, meaning that all data travels between the shortest path between two parties, eavesdroppers positioned along a shortest path are able to "listen in" on data traveling over TCP connections.

In summary, all data sent in the multimedia system 2, whether between clients and the server or just between clients, is encrypted.

A second efficiency requirement mandates that the number of addresses that clients must handle is minimized. This requirement is met since the previous two requirements imply that a client is able to determine which encryption key to use solely based upon the destination address of a multicast packet. A third efficiency requirement generally mandates that the number of encryption keys a client must handle is minimized. More specifically, the third efficiency requirement mandates that the generation of encryption keys is delayed until they are actually needed. This requirement minimizes the number of cryptographic operations the server must perform thereby minimizing the burden of cryptographically-secure key generation that is computationally expensive. A fourth efficiency requirement mandates that even if security considerations would otherwise permit receipt of transmission from other users, a client avoids preparing and sending A/V data unless it is actually being received by someone. In other words, there is no need to prepare A/V data for distribution to a multicast audience if no client is looking at, or listening to a particular multicast address. The fourth efficiency requirement exists in order to minimize the processing of video data, which is computationally expensive for clients to capture, compress and transmit.

A second security requirement mandates that a user at a client controls whether or not a user's audio or video signals are multicast across the network. This level of control, described in detail later, is presented to a user through appearance and behavioral attributes of an application. A third and narrower security requirement mandates that users should only risk multicasting A/V data that they explicitly authorized to be revealed to other users. For example, an application that provides A/V "tunnel" between two users enables the pair of users to communicate as they move about in different virtual places. A user should therefore only risk whatever audio or video signals that are explicitly enabled for the tunnel application to access. A user explicitly controls A/V data transmission by controlling widgets that an application includes in its graphic user interface. Four widgets, cameras, microphones, video panes, and speakers, provide control over receipt and distribution of A/V data.

C. The User Interface

Figure 3:
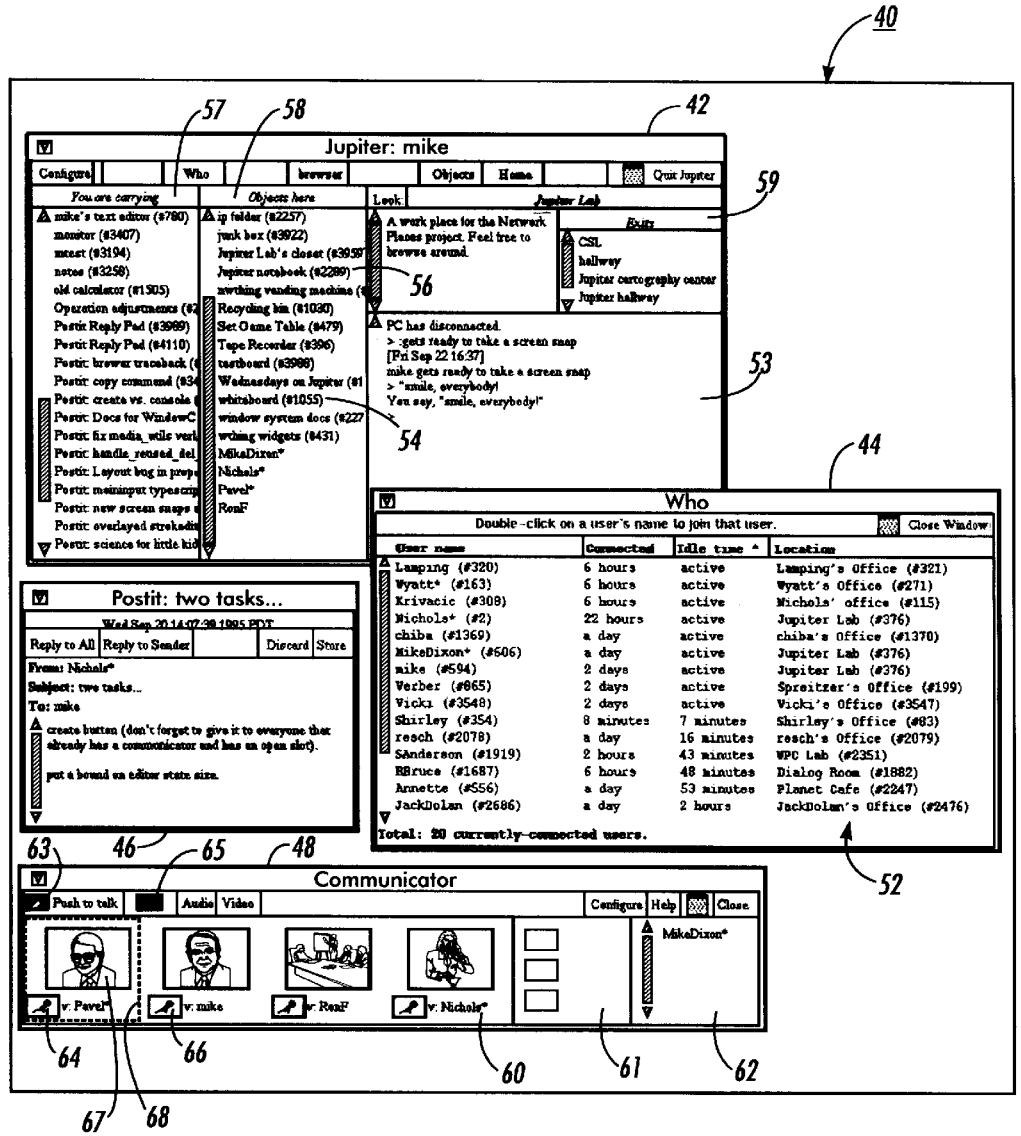
FIG. 3 is a plurality of simulated screen images used to depict the collaborative environment embodying the present invention.

FIG. 3 shows a plurality of simulated window images 40 used to depict the collaborative environment 10 (shown in FIG. 1). The window images 40 include console window 42, "who" window 44, "Postit" window 46, and communicator window 48. The console window 42 (or mike's console window) and communicator 48 (or mike's communicator) are two different views on the user "mike." The who window 44 provides information of all logged in users (e.g. how long they have been connected, how long they have not been active on the system, and where they are presently located). The postit window 46 is a metaphor for the Post-it™ note. Generally, the virtual world of the collaborative environment 10 is composed of a set of interconnected places such as room objects that serve as network places to structure interaction between user objects. Each user is located in a room, and possibly the same room as other users. To a first approximation, each user sees and interacts with other users and objects located in a similar network place such as a room object. Users can control the extent of their participation in the network place by moving themselves and objects from place to place. Communication between users takes the form of typed messages, spoken audio, and live video images. Thus, users who are virtually in the same network place can see and hear each other even though there may be a considerable distance between the physical locations of the users.

The console window 42 shown in FIG. 3 is one view of the user mike. Console 42 provides an overview of what 37 stings" in this network place that are available to mike, the user. From the perspective of each user who is connected to server or "jupiter" 22, the collaborative environment 10 is a virtual world made up of rooms or locations displayed in the who window 44, as indicated generally by reference number 52. Each user is therefore in a network place or room 42. In FIG. 3, user "mike" is connected to the "jupiter" server 22 and is in the "jupiter lab," as indicated on mike's console window 42. In each room or "network place," such as the jupiter lab, there may be a plurality of virtual objects and tools, such as a virtual whiteboard 54 on which pictures and diagrams are drawn, and documents such as the "jupiter notebook" 56.

Mike's console window 42 lists what objects mike is carrying, in sub-window 57, what objects are in the same room as him, in sub-window 58, and the visible exits from the room that he is in sub-window 59. Thus, user mike may select from a plurality of "exits" 59 from which he may move into another room. Sub-window 53 enables user mike to input new commands and view his history of past commands and status events. In sum, a console window 42 for any user depicts relationships between objects and users. Also, as previously noted, this collaborative environment is persistent in that these relationships between people and objects are maintained over time. The console window 42 in listing the other objects in the "jupiter lab" in sub-window 58, includes all the users who appear in the communicator window 48. Mike's communicator window 48 provides mike with another view that enables him to communicate with other users who are in the same room using audio or video data.

A communicator window 48 contains microphone widgets (such as microphone widget 63), camera widget 65, and video pane widgets (such as video pane widget 67). A speaker widget highlights when a particular user speaks. For example, video pane widget 67 and microphone widget 64 are surrounded by an invisible rectangle which represents a speaker widget 68 (shown using a dotted line). Users with video and audio turned on using buttons 63 and 65 in a particular room will appear in communicator sub-window 60. Users however that only have audio turned on or neither audio or video turned on appear in sub-windows 61 and 62, respectively. The microphone and camera widgets are used to control sending of a user's audio and video data to users in a room, and the video pane and speaker widgets are to receive A/V data from other users in the room. All video and audio transmission from a client 2 (or user), and all video and audio output to a client is tied to one or more of the four A/V widgets (i.e. microphone, camera, video pane, and speaker) that an application may include in an open window on a user's display. Consequently, a user is able to easily control whether its audio or video data is being sent, and which applications it wants to entrust its A/V data transmission. Also, users are able to easily identify which applications are currently delivering sounds, and to shut them off when they do not wish to hear them.

Camera and microphone button-like widgets 63 and 65 used in an application window, such as the communicator 48, allow a user to monitor and control their local audio and video. Each button-like widget contains an icon that is provided by a user's client program to represent the local audio and video device each controls. Similar to other button-like widgets, an application can define its own textual labels or other content in addition to the widget icons. When either a microphone or camera widget is turned on, the background and foreground colors of the icon representing each is reversed, thereby signaling the transmission of A/V data. Camera widgets 65 act a simple toggle buttons that are switched from on to off. Microphone widgets 63, on the other hand, support similar on and off toggling as well as "push-to-talk" mode. Specifically, a push-to-talk button supports a mode that enables sending A/V data only to a destination associated with a particular widget when the button is depressed. Thus, engaging a push-to-talk button temporarily interrupts transmission associated with any other microphone widget that may be turned "on" for a particular device. In order to integrate push-to-talk mode with on and off toggling mode, a user is required to depress a shift key while selecting a microphone widget to toggle a mike on and off, similar to turning a camera widget on and off.

Figure 4:
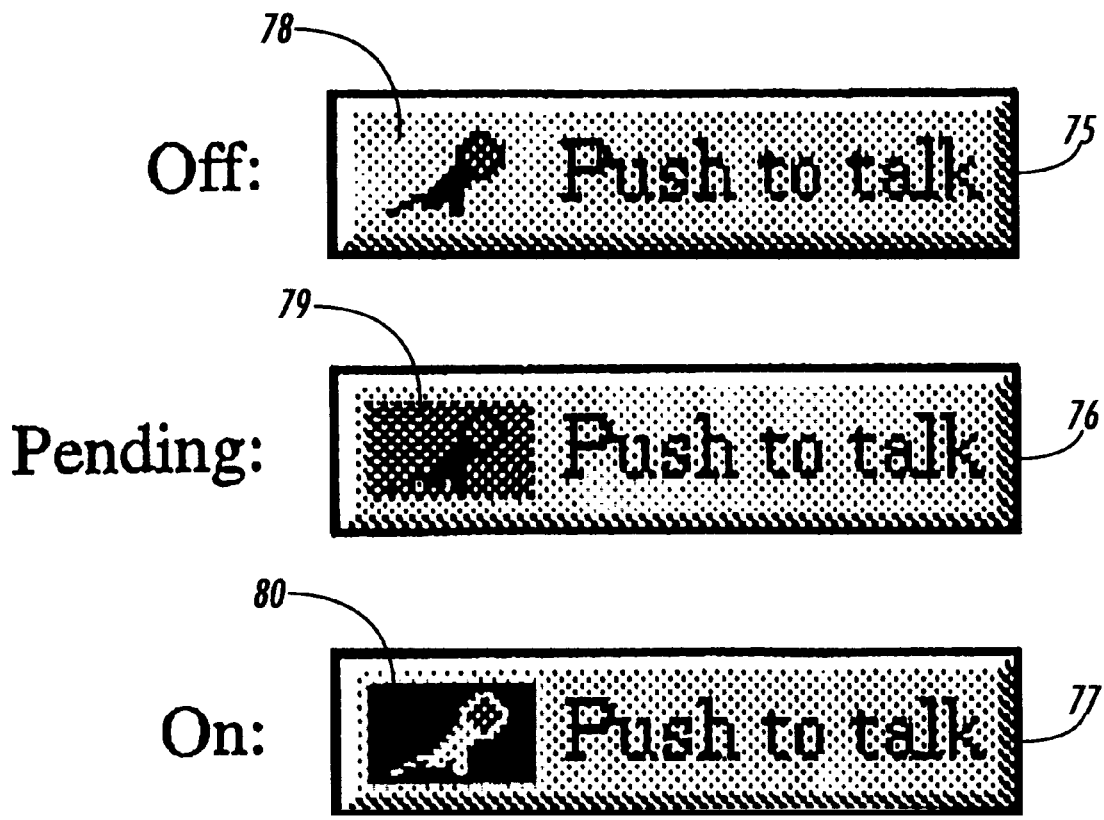
FIG. 4 is an illustrative example of three states of a microphone widget.

When turning a camera or microphone widget on or off a period of communication latency may be introduced when notifying the server 22 to acquire appropriate multicast address and encryption key information. The period of communication latency is reflected in the user interface by switching a widget's background color to a stippled color before reversing foreground and background colors to show a user's request is in progress. For example, FIG. 4 shows a microphone widget initially in an "off" state 75, once selected toggles to an intermediate "pending" state 76, during the latency period, and finally toggles to the "on" state 77 once server 22 has provide requested information. A stippled background 79 signals to a user that its request is being processed, but that the audio or video transmission has not actually changed state yet. After the period of communication latency, a widget's color is reversed, as seen generally by microphone widgets 78 and 80. Communication latency is typically under a second which, is satisfactory in most cases. Push-to-talk mode, however, requires a faster response time. As described in detail later, push-to-talk buttons avoid communication latency after the first time they are selected.

The icons for microphone and camera widgets are provided by a program running on each client 4. Consequently, a user is guaranteed the security that genuine camera and microphone widgets will be recognizable in different applications. In particular, the client guarantees that when icons for microphone and camera widgets are first displayed in windows on a display terminal each widget is in an "off" state, and that only a user may turn them on. Thus, microphone and camera widgets require explicit action by a user for audio or video data to be transmitted to other clients.

With reference again to FIG. 3, video pane widgets 67 are used to display an incoming video stream. Each video pane is associated with a single video source at any given time. The video pane widget resizes an incoming video stream to fit in the space available when necessary. In addition, each video pane widget can be set to display video in either grayscale or color, and perform any required dithering on displays terminals having limited pixel depth. Below each video pane widget is a microphone widget that serves as a push-to-talk button for "whispering" (or talking personally) to an indicated user. For example, Pavel's video image 67 includes beneath it push-to-talk microphone widget 64. There is no difference between whisper widgets 64 and non-whisper or room widget 63. A user can invoke two whisper buttons 63 and 66 at the same time if the user locks down both microphones widgets. A user cannot invoke push-to-talk on two whisper buttons at once, however. Using push-to-talk on any microphone widget effectively turns off any other microphone widgets that are "on" at the time.

Speaker widgets 68 act as borders around a collection of A/V widgets (e.g. video pane, microphone). The border highlights whenever a client plays audio from a source associated with that widget. A client will not play any audio stream through a local speaker device 16 (shown in FIG. 1) unless there is a corresponding speaker widget associated with the source of that stream of audio data indicated (e.g. by a highlighted border) in an open window on the user's display screen. This insures that a user can always identify the source of any audible sounds and also guarantee that the user has control over whether audio data will be continued to be played on the local speaker device 16. A user can terminate audio transmission by closing an offending window. Audio data from multiple sources which arrives simultaneously is added together and played on the client's speaker, independent of where it is coming or which users are sending it.

D. Communication Coordination System

Figure 5:
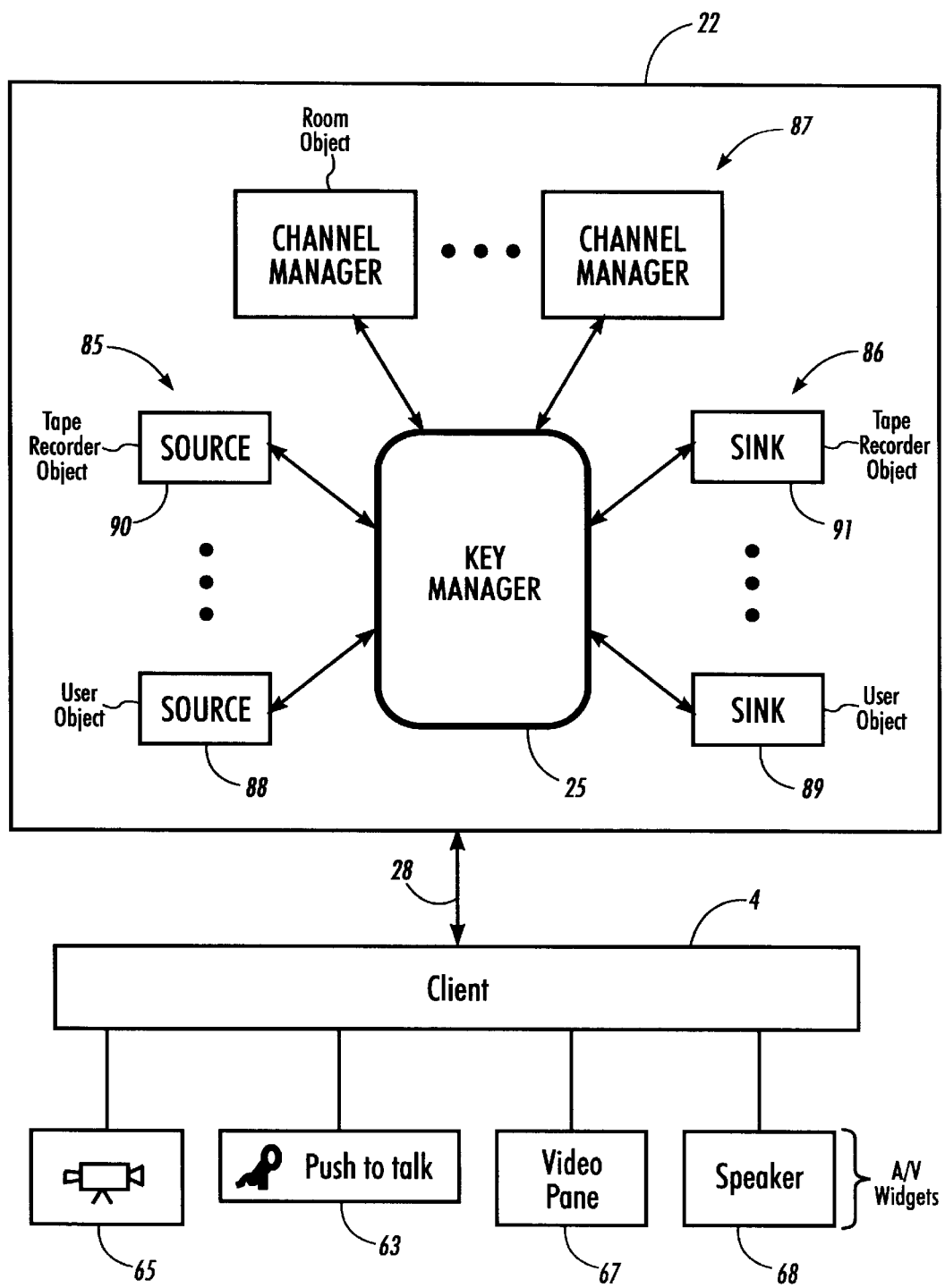
FIG. 5 is a block diagram representing various elements that interact with the key manager.

FIG. 5 is a block diagram representing various elements that interact with key manager 25. Key manager 25 is a coordinator and a key generator. The key manager coordinates all A/V multicast data transmitted between each client 4 connected to server 22. Once encryption keys have been generated for a particular source of A/V data, the key manager is responsible for notifying clients 4 of appropriate multicast addresses and encryption keys for use with out-of-band communication. "Out-of-band" communication is defined herein as data that is multicast between clients, while "in-band" communication is defined herein as all data that is passed from one client to other clients through server 22.

The key manager or coordination system 25 generalizes away from A/V widgets such as microphone widget 63, camera widget 65, speaker widget 68, and video pane widget 67, since audio and video transmissions may originate from objects other than user objects. These A/V widgets are labeled as either sources or sinks, which are indicated generally by reference numbers 85 and 86, respectively. For example, camera widget 65 and microphone widget 63 of a user's database object act as a source 88, while speaker widget 68 and video pane widget 67 of a user's database object act as a sink 89. Other database objects such as a tape recorder object may act as source 90 and sink 91. The tape recorder object would act as source 90 or sink 91 depending on whether the object was being used for playback or recording.

Besides communicating with sources 85 and sinks 86, the key manager 25 communicates with channel managers 87 which can be any database object such as a room object 37 (shown in FIG. 2). Sources 85, sinks 86, and channel managers 87 do not, in general, communicate with each other directly. Each object interfaces with a single coordinating object, the key manager 25. Specifically, sources 85, sinks 86, and channel managers 87, each call or are called by the key manager 25. The key manager 25 translates abstract requests made by each source, sink, or channel manager object into a multicast address and encryption keys to be used by clients 4 when sending and receiving out-of-band A/V data. In addition, the key manager coordinates the passing of any in-band data between sources and sinks.

Figure 6:
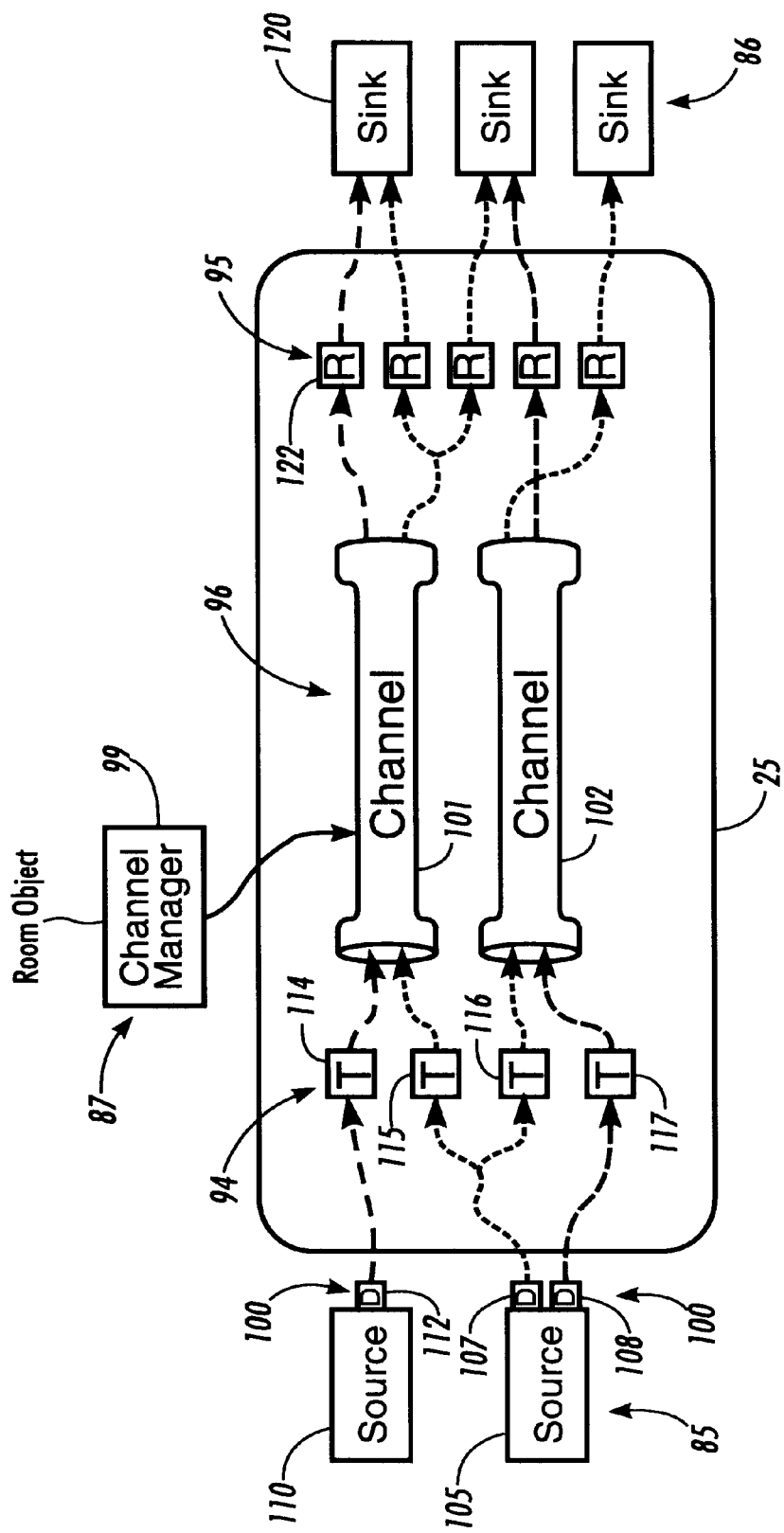
FIG. 6 is a block diagram showing the key manager in FIG. 5 in more detail.

FIG. 6 shows a more detailed block diagram of the key manager or media coordination system 25 interfacing with sources 85, sinks 86, and channel manager 87. Each source device 85 can have a plurality of devices 100 associated with it. Each device 100 is capable of generating a stream of audio or video data. For example, a user object in database 26 (shown in FIG. 2) may act as source object 105. The devices associated with source 105 are devices 107 and 108 which correspond to physical audio and video inputs at a client workstation 4 (shown in FIG. 2). Alternatively, a tape recorder object may act as source object 105. The tape recorder object may have one device for each stream of audio data played back. For example, source 105 would have devices 107 and 108 for two streams of audio being played back.

Sources 85 transmit to sinks 86 through channels 96. A channel is an abstraction in the object database 26 that represent pipes through which audio and video streams flow. Each channel 96 has associated with it either a static or dynamic channel membership. Each channel membership defines which sources and sinks have access to a particular channel. Channels with a dynamic membership list have an associated channel manager 87. Each channel manager 87 is responsible for notifying the key manager 25 whenever the membership of its channel changes. In essence, the channel manager 87 decides who is allowed to be on a channel. For example, a room object acting as a channel manager 99 for channel 101 will have a channel membership list consisting of all of the objects within the room. The membership list of channel 101 changes each time a user object leaves or enters the room. For each exit and entry of the room, the channel manager 101 is required to notify the key manager 25 of each change in its membership list. Alternatively, channel 102, which does not have a channel manager, is an example of a channel with a static membership lists. Channels with static membership lists are typically used when two user objects are "whispering" to each other (or carrying on a private conversation) in a room. In the case of two user objects whispering to each other, the channel membership of that channel consists of just the two user objects.

1. Key Manager Interface

The key manager 25 is a central coordination system between sources, sinks, and channel managers. The key manager interface pertains to the manner in which the key manger 25 interacts with sources, sinks, and channel managers. Table 1 lists methods that key manager 25 provides for sources 85, and Table 2 lists notifications that key manager 25 sends back to sources 85. (Note: every method call in Table 1 passes a source object as an implicit parameter to the key manager. This implicit argument, however, is overridden by widget implementations; from the key manager's perspective, the calling source or sink always appears to be the object representing the user on whose screen a widget appears. This approach allows the key manager to treat user objects in the same way as other sources and sinks.) Each source 85 declares an intent to transmit A/V data by creating a transmitter 94 and by associating the transmitter with a device 100, using the create_transmitter ( ) and set_transmitter_device( ) methods respectively. For example, source 110 declares an intent to transmit A/V data by creating transmitter 114 and by associating transmitter 114 with device 112. Generally, each source 85 creates a transmitter 94 for each reason that source may transmit A/V data. For example, a user object acting as source object 105 has transmitters 115, 116, and 117 for specific camera or microphone widgets on a user's display terminal. A transmitter is destroyed once it is no longer required using the destroy_transmitter( ) method.

TABLE 1

Key manager methods called by sources create_transmitter( ) => transmitter
set_transmitter_device(transmitter, device)
set_transmitter_channel(transmitter, channel)
add_broadcaster(transmitter) => {address, key}
remove_broadcaster(transmitter) => {address, key}
get_transmitter_address(transmitter) => {address, key}
broadcast_value(device, value)
transmit_value(transmitter, value)
destroy_transmitter(transmitter)

TABLE 2

Key Manager notifications sent to sources use_broadcast_address(device, address, key)
use_transmitter_address(transmitters, address, key)
broadcast_has_receivers(device, yes_or_no)
transmitters_have_receivers(transmitters, yes_or_no)
transmitters_rejected(transmitters, channel)

A source 85 aims a transmitter 94 at a particular channel 96 using the set_transmitter_channel( ) method provided in Table 1. The "channel" argument for each method or notification in Tables 1 and 2 is either an object that acts as a channel manager (a dynamic channel membership list) or a list of sources and sinks (a static membership list). A transmitter can only be aimed at one channel at a time. For example, transmitter 114 is aimed by source 110 at channel 101. Any attempt made to aim a transmitter at a channel when a source is not a member of the channel would result in a transmitters-_rejected( ) notification delivered back to the source from the channel manager 87. The transmitters_rejected( ) notification is also sent to a source object 85 if the channel membership maintained by a channel manager 87 is changed and no longer includes that source. Thus, a transmitters_rejected( ) notification is received either right away if a source tries to aim a transmitter at a channel when they are not a member of the channel, or subsequent to being aimed at a channel if a channel's membership changes to no longer include the source.

A source is able to create multiple transmitters for the same device. For example, source 105 created device 107 and associated it with transmitters 115 and 116. A source 85 indicates to a channel manager 87 whether its transmitters are active or inactive by calling the add_broadcaster( ) and remove_broadcaster( ), respectively. The set of active transmitters for a particular device 100 is defined herein as its "broadcast set". For example, device 107 is shown in FIG. 6 as having active transmitters 115 and 117 in its broadcast set. The method calls add_broadcaster( ) and remove_broadcaster( ) are made as camera and microphone widgets in a room are toggled on or off by a user. After these method calls are made, the transmitter corresponding to a particular widget is either added or removed from the broadcast set for the transmitter's designated device. These operations take place while a widget's button is in its pending or stippled state 76 (shown in FIG. 3). The add_broadcaster( ) and remove_broadcaster( ) method calls return the multicast address and encryption key to use when broadcasting from a device. When a channel membership change occurs a new multicast address and encryption key are delivered to a source using the use_broadcast_address( ) notification. A corresponding client is subsequently notified to update the multicast address and encryption keys assigned to existing widgets.

For example, device 107 in FIG. 6 has a set of transmitters 115 and 116 associated with it. The transmitters 115 and 116 connect that device to particular channels 101 and 102, and each transmitter of that device can either be "on" or "off". A transmitter is "on" when the source 105 intends to send data from the device 107 to a channel, such as the channel 96 pointed to by the transmitter 115. In the user interface or communicator window 48 in FIG. 3, this is reflected by the user pressing a camera widget button 65 or locking down a microphone widget button 63, turning each widget button's background black The set of transmitters which are "on" for a device make up the device's "broadcast set". This set may be a subset of all of the transmitters associated with a device, since the set changes as transmitters get turned "on" or "off". Each time a transmitter is added or removed from the broadcast set, the key manager 25 picks a new multicast address and encryption key for the device. However, as discussed above, the key manager always tries to provide a single address & key to be used when sending data, even if the data is conceptually going to a number of channels simultaneously.

The media coordination system is not limited to a notion of transmitters being "on" or "off" so that a new multicast address & encryption key has to be created each time a user toggles a widget button. In this on and off mode, issuing new addresses & keys add to the latency perceived by a user since a message exchange between client 4 and server 22 is required to alter where a client is broadcasting A/V data. With push-to-talk mode (as opposed to on and off mode) a client is issued an individual multicast address and encryption key for sending A/V data to a single channel. Consequently, a client is free to use this individual multicast address and encryption key instead of the current multicast address and encryption key at any time, to effectively shut off a client's transmissions to every channel except the single channel for a while. In other words, once an individual multicast address and encryption key is defined for the single channel, a client is able to switch channels without communicating with the server. As a result, a receiver may be required to listen to two multicast addresses (using two corresponding encryption keys) for each sender, where one of the pairs of addresses and keys is a normal broadcast address & key assigned to that sender and the other is an individual channel address & key. For efficiency, an individual address & key is not assigned until it is requested by a client who is sending A/V data over a single channel. Specifically, to support push-to-talk mode of microphone widgets 63, sources 85 request a multicast address and an encryption key for sending only to a particular channel using the get_transmitter_address( ) method in Table 1. Once the get_transmitter_address( ) method call returns an assigned address and key, a client is able to switch in and out of push-to-talk mode without any further communication with the server, thereby mining client-server latency. Should the address or key change due to a change in channel membership, the key manager sends the use_transmitter_address( ) notification in Table 2.

To minimize source transmission of A/V data, the key manager 25 keeps track of whether receivers 95, a sink's equivalent of a transmitter 94, currently exist for each device of each source 85. When an individual address & key for a channel is to be assigned and a user object has a device with a broadcast set containing only one transmitter on that channel, the broadcast address & key can be the same as the individual channel address & key. As soon as some other transmitter is added to the broadcast set, a new broadcast address & key is distributed which does not match the individual address & key. The key manager 25 sends the broadcast_has_receivers( ) notification whenever a set of receivers for a device's broadcast set starts or stops being empty. Similarly, individual transmitters are notified in a similar way with the transmitters_have_receivers( ) notification. For efficiency reasons, the key manager 25 uses the same multicast address for two transmissions if a group of receivers is identical. This requirement is the same for the key manager when it picks and distributes encryption keys. Thus, any given multicast address has only one encryption key in active use at a time.

In addition to assigning addresses and keys for sending out-of-band data, the key manager 25 provides a mechanism for sending small amounts of in-band data. In-band data is intended primarily as a means for a source to send the name of a sound, image or video sequence that it wishes recipients to retrieve and display or play. For example in-band data can be used to generate audible sounds when a user enters a room. Such in-band data is sent to either a device's broadcast set using the broadcast_value( ) method, or to a specific channel using the transmit_value( ) method.

Table 3 lists methods key manager 25 provides for sinks 86, and Table 4 lists notifications provided by key manager 25 to sinks 86. (Note: as with other method calls, a sink parameter is an implied parameter of each method call.) Each sink 86 declares its intent to receive a specific A/V data stream sent through a channel 96 by creating a receiver 95 and associating it with the specific A/V data stream, using the create_receiver( ) and aim_receiver( ) receptively. For example, each video pane widget 67 (shown in FIGS. 3 and 5 ) displayed on a user's display terminal has a single associated receiver. In contrast, each speaker widget 68 has a set of associated receivers. For example, the set of associated receivers for a speaker widget for a room object may include all of the receivers pointed to A/V data streams of user objects in the room.

TABLE 3

| Key manager methods called by sinks |
| --- |
| create_receiver( ) => receiver |
| aim_receiver(receiver, source, device, channel) |
| unaim_receiver(receiver) |
| destroy_receiver(receiver) |

TABLE 4

| Key manager notifications sent to sinks |
| --- |
| use_receiver_addresses(receivers, list of {address, key }) |
| receivers_have_transmitters(receivers, yes_or_no) |
| receive_value(receivers, value) |
| receivers_rejected(receivers, channel) |

Specifically, a sink uses the aim_receiver( ) method in Table 3 to associate a receiver 95 with an A/V data stream from a particular source 85 and device 100 sent through a given channel 96. For example, in FIG. 6, sink 120 has aimed receiver 122 at channel 101 to receive an A/V data stream from source 110 and device 112. Similar to sources, a sink 86 can only aim a receiver 95 at a channel 96 if the sink is in the channel's membership list (whether it is a static or dynamic list). If a sink 86 is not in a channel's membership list, the sink will receive a receivers_rejected( ) notification from the key manager 25.

Similar to sources, as new multicast addresses and encryption keys are generated by key manager 25 for particular receivers 95, sinks 86 are sent the use_receiver_addresses( ) notification. This notification informs a sink of a set of addresses and keys that sources will use to encrypt and send out-of-band A/V data to a sink's set of receivers. Since a client 4 can switch between sending to its broadcast set address (discussed above) and an individual transmitter address without notifying the server 22, the key manager 25 provides both addresses and keys to receivers when both have been assigned. In addition, to allow sinks 86 to discard useless receivers 95, the key manager 25 sends the receivers_have_transmitters( ) notification as a set of corresponding transmitters starts and stops being empty. Also, sinks 86 receive in-band information from sources via the receive_value( ) notification.

Any database object can be a channel manager by supporting a channel_in_use(yes_or_no) key manager notification. This notification is sent by the key manager to a specific channel manager whenever a set of transmitters and receivers aimed the specific channel manager starts or stops being empty. In other words, when the notification parameter "yes_or_no" is true, the specific channel manager should begin informing the key manager of the membership of the channel using the set_channel_membership (members) method. The specific channel manager should notify the key manager 25 both immediately and whenever a channel's membership changes at some future time.

A given object in the object database can be a channel manage for at most one channel, since a particular object serves as a particular channel's unique name in method calls to set_transmitter_channel( ) and aim_receiver( ). A channel's membership list consists of either sources or sinks or both, although providing independent source and sink membership lists may be useful. When changing what channel a receiver is pointing at or when destroying a receiver, the unaim_receiver( ) and destroy_receiver( ) methods are used.

Table 5 lists methods key manager 25 provides for both sources 85 and sinks 86, and Table 6 lists notifications provided by key manager 25 to both sources 85 and sinks 86. The watch_channel( ) method call provides a way for sources and sinks to be notified of changes to various aspects of a channel's state. A channel's aspects include a channel's membership list and the set of transmitters and receivers aimed at the channel. Watchers (not shown) are sent the channel_changed( ) notification whenever any specified "aspect" changes. When a channel is watched, a "watcher," which is typically a source or a sink, can be set to be notified when only specific "aspects" of a channel's state have changed. "Aspects" of a channel's state include: membership, transmitters, receivers, and secure. Any number of aspects can be watched. Consequently, specifying a channel to be watched for a change in membership does not generate notifications to the source or sink when a transmitter is destroyed or created on that channel. As with other methods, sources and sinks can only watch a channel when they are in its membership list. Should the source or sink later become excluded from the membership list, each would receive a watching_rejected( ) notification.

TABLE 5

Key manager methods called by sources and sinks watch_channel(channel, aspects)
channel_membership(channel) => members
channel_transmitters(channel) => list of {(source, device}

TABLE 5-continued

Key manager methods called by sources and sinks channel_receivers(channel) => list of {sink, source, device}
channel_is_secure(channel) => boolean

TABLE 6

Key manager notifications sent to sources and sinks channel_changed(channel, aspect)
watching_rejected(channel)

Any source or sink that is a member of a channel can use the channel_membership( ) method call to discover the complete membership of a channel. This method call relies on the key manager and not the channel manager to prevent the latter from maliciously giving different answers to different sources and sinks. Members of a channel can also use the channel_transmitters( ) and channel_receivers( ) method calls to find out what signals are available through a given channel and which of those signals are being received and which sinks are receiving those signals.

Communication over a channel is secure as long as the key manager generates each key distributed to sources and sinks. A channel manager could alternatively pick an address and key instead of having the key manager generate them. A channel manager is provided with this functionality in order to allow sessions generated from outside the central server to be viewed using the four A/V widgets (e.g. microphone, camera, video pane, and speaker). In this case, the key manager can not make any guarantees about who knows or has the keys, so the channel is marked as insecure. The channel_is_secure( ) method enables sources and sinks to determine whether a key, which has been distributed by the key manager, is secure.

2. Key Manager Data Structures

The key manager 25 is conditioned to notify changes of addresses and keys only when necessary. To do this the key manager must maintain several mappings that hold current states of channels, transmitters, devices, and receivers that are listed in Table 7. The mappings listed in Table 7 balance between redundant information and efficiency. The four mappings provide sufficient information to implement the method calls and notifications in Tables 1–6. When certain transitions or changes occur in the values of the sets or data structures in Table 7, appropriate notifications are sent to a channel, transmitter, device, or receiver. These notifications are sent by the key manager when changes occur to values in the data structures that the key manager maintains. These changes are generally triggered from a call by a source, sink, or channel manager to the key manager to perform some action such as creating or destroying a transmitter or receiver, changing where a transmitter or receiver is aimed, or changing the membership of a channel.

TABLE 7

Key manager data mappings

C[channel] => <members, xmtrs, rcvrs, address, key, watchers>
T[source] => <device, channel, is_broadcaster>
D[source, device] => <has_rcvrs, address, key>
Z[source, device, channel] => <xmtrs, rcvrs>

3. Widget Interface

When a microphone or camera widget is created, the widget makes a call to create_transmitter( ) in Table 1. The resulting transmitter is saved as part of the widget's private state. Two methods available on microphone and camera widgets are: set_device(device) and set_channel(channel). These two methods are used by applications to set from which of a user's local devices to get a signal and to which channel to send a signal respectively. Microphone and camera widgets then make calls to set_transmitter_channel( ) and set_transmitter_device( ) as appropriate. It is expected that a user's client program will send back an event that the specific widget has been turned off when it receives a set_device( ) method call. This communication ensures that an application program running on the server will not cause a user to start sending from a different device without an explicit action from that user.

Server applications set which sources a speaker widget should listen to by calling the speaker widget method: set_sources(list_of {source, device, channel volume}). When the set_sources( ) method is called, a widget creates a set of new receivers, one aimed at each of the given sources in the list. The volume arguments are passed onto the client program. The volume argument allows an application to specify the relative level of incoming audio, so that certain streams can be played more softly than others. This is useful for example, when trying to play audio from sources that are virtually "farther away," such as in a nearby room. One difference between speaker widgets and video pane widgets is that, a single receiver for a video pane can be created and saved once the widget is created since a video pane widget can only receive at most one signal at a time. Thus, the video pane widget re-aims a receiver whenever the application changes the source to which the widget is listening to. To make this change at a client, applications call the set_source(source, device, channel) video pane method.

E. Illustrative Implementation

Figure 7:
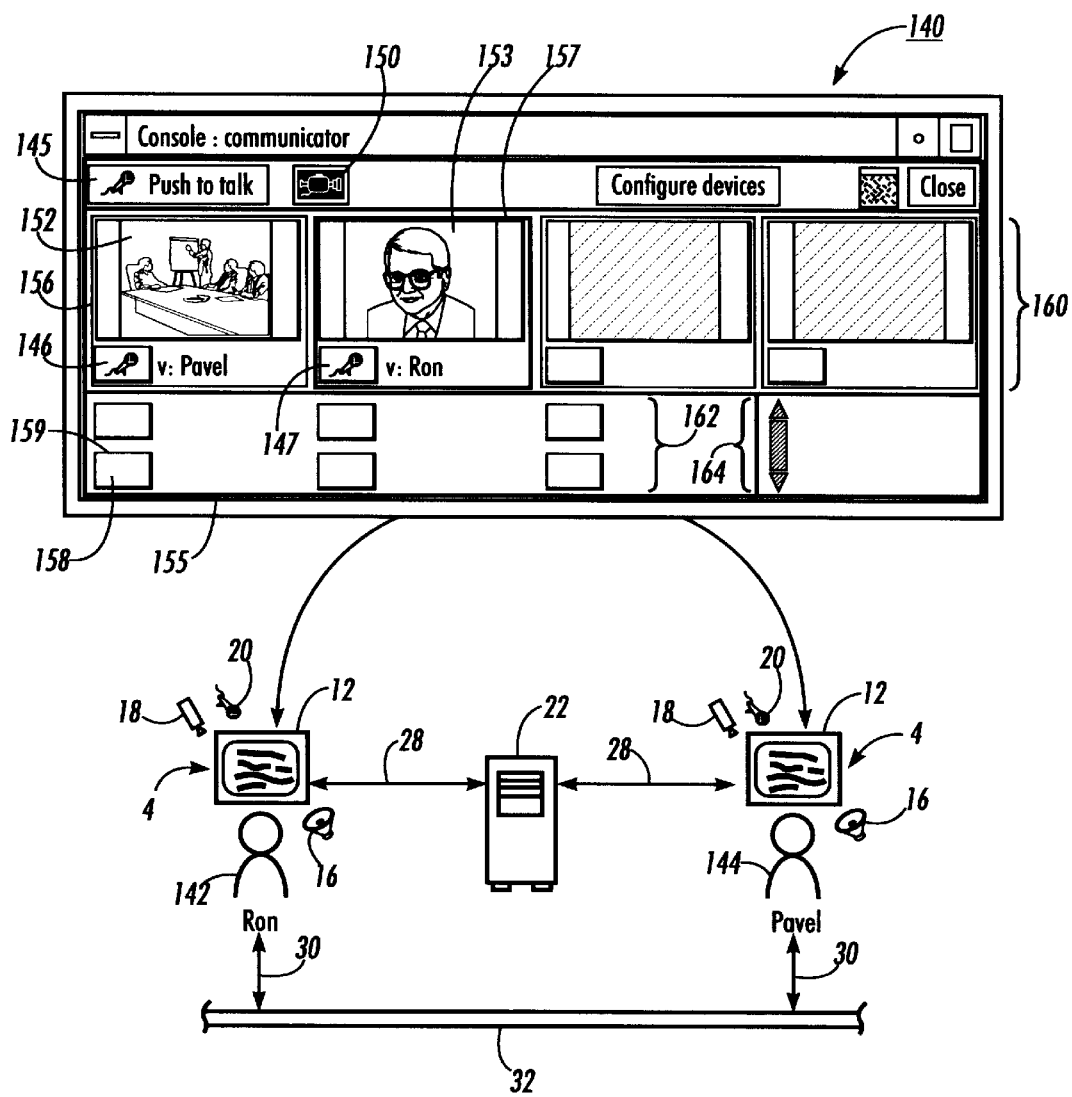
FIG. 7 is a simulated screen image used to illustrate the persistent collaborative environment shown in FIG. 1.

FIG. 7 is a representation of the communicator window 48 shown in FIG. 3. As in FIG. 3, the communicator window 140 represents a virtual room in which user "Ron" 142 and user "Pavel" 144 are communicating in a virtual environment. User Ron 142 and user Pavel 144 are each able to view communicator window 140 on display screens 12 of their respective client workstations 4. (The communicator window 140 does not have to appear identical at each client workstation.) Client workstations 4 receive and transmit audio and video data over multicast connections 30 and 32. The virtual room is defined as a room object 37 in database 26 (shown in FIG. 2).

The communicator window 140 contains microphone widgets 145, 146, and 147, camera widget 150, video pane widgets 152 and 153, and speaker widgets 155, 156, and 157. The communicator window is divided into three regions 160, 162, and 164. A user providing video appears in region 160. A user who is not providing video but is providing audio appears in region 162. A user who either will not fit in the rest of the console area or who is not providing video or audio appears in region 164. The virtual room represented by communicator 140 has associated with it a primary camera widget 150, a primary microphone widget 145, and a speaker widget 155 which surrounds all three regions 160, 162 and 164. An individual user object in region 160, Pavel for example, has associated with it microphone widget 146, video pane widget 152, and speaker widget 156 which surrounds the microphone widget 146 and video pane widget 152. A user in region 162 has associated with it a microphone widget 158 which is surrounded by a speaker widget 159. Whenever any user talks, their associated speaker widget highlights. When a user speaks to the virtual room and not specifically to another user (i.e. whispering), speaker widget 155 highlights. In FIG. 7, Ron's speaker widget 157 and the virtual room's speaker widget 155 are highlighted with a dark border surrounding each respective widget. These dark borders surrounding both Ron and the virtual room indicate that Ron is speaking to the room. On the other hand, a dark border surrounding only Ron and no dark border surrounding the virtual room on Pavel's communicator window indicates that Ron is whispering to Pavel.

Figure 8:
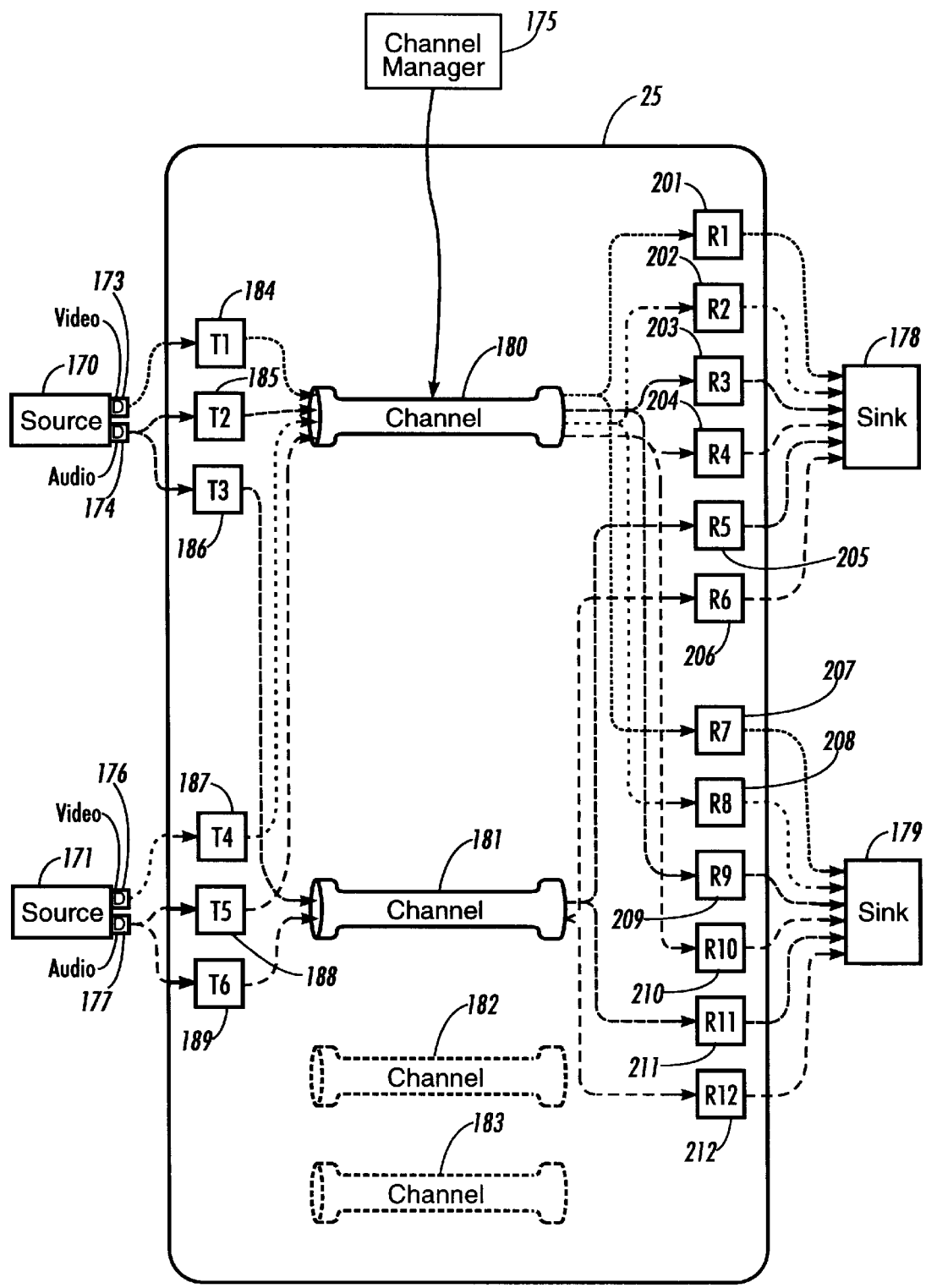
FIG. 8 is an exemplary representation of the key manager when coordinating communication for the collaborative environment shown in FIG. 7.
Figure 9:
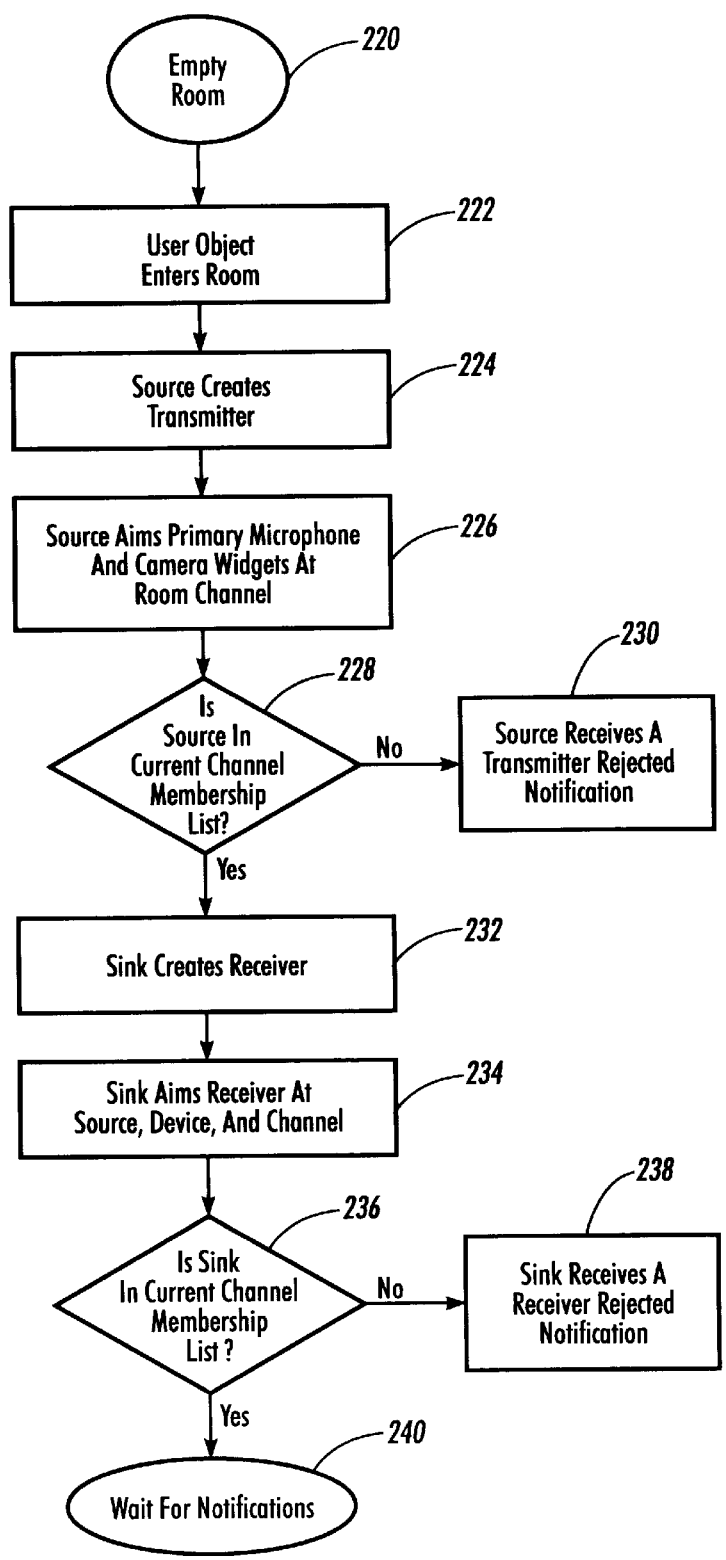
FIG. 9 is a flow diagram showing the general steps associated with developing the A/V connections shown in FIG. 8.

FIG. 8 illustrates a key manager 25 representation of A/V data connections for the communicator window 140 shown in FIG. 7. The A/V data connections enable Pavel and Ron to carry on visual and audio conversations in the virtual room depicted by communicator 140. FIG. 9 is a flow diagram showing the general steps associated with developing the A/V data connections shown in FIG. 8. With reference to FIG. 8, source 170 and sink 178 are associated with Pavel's user object, while source 171 and sink 179 are associated with Ron's user object. Each source 170 and 171 has associated devices 173–174, and 176–177, respectively, that correspond to physical video input from cameras 18 and audio input from microphones 20. As described previously, the room object in which the user objects of Pavel and Ron are located, acts as channel manager 175 and manages a dynamic membership list.

Initially at step 220, the room object representing the communicator window 140 is empty. At this point the room object has already created room channel 180. At step 222, Pavel's user object and Ron's user object are visible in communicator window 140 representing the room object. At this point, any speaker or video pane widgets that were pointing at users in a previous room are cleared. In addition, the room object which acts as channel manager 175 updates the channel membership list to include user objects for Pavel and Ron in its membership list. The channel membership of a room is not limited to users in the room; it includes all objects that are present to allow for participation of non-user object sources and sinks (e.g. tape recorder objects).

At step 224, sources 170 and 171 create transmitters for the camera widget 150 and each microphone widget 145, 146 (for Ron's Source), and 147 (for Pavel's Source) using key manager method create_transmitter( ). The resulting transmitters that are saved as part of each widget's private state include: transmitter 184 which corresponds to primary camera widget 150 on Pavel's communicator window 140; transmitter 187 which corresponds to primary camera widget 150 on Ron's communicator window 140; transmitter 185 which corresponds to primary microphone widget 145 on Pavel's communicator window 140; transmitter 188 which corresponds to primary microphone widget 145 on Ron's communicator window 140; transmitter 186 which corresponds to whisper microphone widget 147 on Pavel's communicator window 140; and transmitter 189 which corresponds to whisper microphone widget 146 on Ron's communicator window. For simplicity, transmitters for microphone widget 146 on Pavel's communicator window 140 and microphone widget 147 on Ron's communicator window 140 are not shown in FIG. 8.

At step 226, transmitters 184, 185, 187, and 188, which correspond to Pavel's and Ron's primary camera widget 150 and microphone widget 145, respectively, are aimed at room channel 180 using the set_transmitter_channel( ) method. At step 228, the channel manager 175 verifies whether each source requesting that a transmitter is aimed at the room channel 180 is in the room's current membership list. If the source is not in the current membership list, the source receives a transmitter_rejected( ) notification from channel manager 25, at step 230.

At step 232, sinks 178 and 179 indicate their interest in receiving particular audio and video streams by creating receivers 201–212. At step 234, each receiver 201–112 is associated with a specific signal sent through a particular channel using the aim_receiver( ) key manager method. Specifically, receivers 201–204 and 207–210 are aimed at room channel 180. Similar to sources, at step 236, the room's channel manager 175 verifies that each sink 178 and 179 are in the channel membership list. If a sink is not in the room channel's membership list, the sink receives a receivers_ejected( ) notification from the key manager 25, at step 238. Subsequently, each source and sink receives address and key notification information from channel manager 25 at step 240.

With specific reference now to FIG. 8, receivers 201–204 created by sink 178 and receivers 207–210 created by sink 179 are associated with Pavel's and Ron's user objects, respectively, and are directed at room channel 180. Each receiver corresponds to a widget on each user's respective display terminal: Pavel's receiver 201 and Ron's receiver 207, which are respectively directed at the video pane widget 152, point to device 173 of source 170 through channel 180; Pavel's receiver 202 and Ron's receiver 208, which are respectively directed at the video pane widget 153, point to device 176 of source 171 through channel 180; Pavel's receiver 203 and Ron's receiver 209, which are respectively directed at the primary speaker widget 155, point to device 174 of source 170; and Pavel's receiver 204 and Ron's receiver 210, which are respectively directed at the primary speaker widget 155, point to device 177 of source 171.

The whisper or private channel 181 is created for push-to-talk microphone widget 146 on Ron's client workstation 4 and microphone widget 147 on Pavel's client workstation 4. FIG. 8 shows the case of Pavel and Ron whispering to each other using channel 181. As noted above, channel 181 has a static membership list and therefore does not have a channel manager associated with it. To set up whisper channel 181, sources 170 and 171 create transmitters 186 and 189, respectively. In addition, sinks 178 and 179 create receivers 205–206 and 211–212, respectively. Transmitters 186 and 189, and receivers 205–206 and 211–212 are aimed at channel 181. Receivers 205 and 211 are set to point to device 174 of source 170, and receivers 206 and 212 are set to point to device 177 of source 171. Each client controls through explicit actions by a user's selection of a widget where to transmit A/V data. When a microphone widget is used as a push-to-talk button for the first time, the widget calls the key manager method get_transmitter_address( ) to have a multicast address and encryption key assigned for a specific transmitter channel.

It will no doubt be appreciated that there are a number of possible manners in which to implement the key manager that could be used effectively with this media coordination system. What is required by this invention is a plurality of client workstations connected to a central server through a network. The central server coordinates streams of audio and video data between clients who multicast their A/V data over the network. The media coordination system combines automatic encryption, dynamic interconnection of streams of data, and user interface elements that provide clients with control over the ultimate destination of their A/V data. Even though a central server is coordinating where A/V information is being broadcast, each client workstation ultimately controls its broadcast.

The disclosed media coordination system may be readily implemented in software using object oriented software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. In a network interconnecting a central server and a plurality of client workstations adapted to sending and receiving out-of-band data, out-of-band data being multicast between some of the client workstations without going through the central server or any intermediary device controlled by the central server, a method for coordinating communication of out-of-band data between some of the client workstations, comprising the steps of:

associating a first client workstation with a device, the device providing multimedia input at the first client workstation;

defining a first transmitter object in a memory of the central server, the first transmitter object being associated with a first transmitter for transmitting data from the device over a first channel;

defining a first receiver object in the memory of the central server, the first receiver object being associated with a first receiver for receiving audio signals over the first channel at a second client workstation;

providing a first encryption key to the first client workstation and the second client workstation to provide secure communication of data over the first channel;

defining, subsequent to said providing step, a second receiver object in the memory of the server, the second receiver object being associated with a second receiver for receiving audio signals over the first channel at a third client workstation; and replacing, in response to said defining step, the first encryption key with a second encryption key, the second encryption key being provided to the first client workstation, the second client workstation, and the third client workstation for communication of data over the first channel so that communication broadcast over the first channel is secure.

2. The method according to claim 1, further comprising the step of managing a membership list of the first channel, the membership list including objects having access to the first channel.

3. The method according to claim 1, further comprising the step of inputting data at the first client workstation through the device.

4. The method according to claim 3, further comprising the step of associating the first transmitter with the device.

5. The method according to claim 4, further comprising the step of associating a second transmitter with the device, said associating step directing the second transmitter to a second channel.

6. The method according to claim 1, further comprising the step of storing a first channel object associated with the first channel in the memory of the central server.

7. The method according to claim 1, further comprising the step of providing a first multicast address to the first client workstation and the second client workstation.

8. A method of coordinating multicast audio data between a plurality of client workstations connected over a network, each client workstation having a point to point connection with a central server, multicast audio data not going through the central server or any intermediary device controlled by the central server, the method comprising the steps of:

displaying a communicator at a client workstation, the communicator providing a first user interface element to direct audio data from an audio device at the client workstation to a first set of client workstations and a second user interface element to direct audio data from the audio device to a second set of client workstations, the second set of client workstations being a sub-set of the first set of client workstations;

defining, in a memory of the central server, a public channel object associated with a public channel for transmission of audio data to the first set of client workstations and a private channel object associated with a private channel for transmission of audio data to the second set of client workstations;

receiving, at the central server, a first user signal from the communicator at the client workstation to direct audio data from the audio device to the public channel;

providing via the central server, in response to the first user signal, a first encryption key to the client workstation, the first encryption key facilitating encryption of audio data to be transmitted between the client workstation and the first set of client workstations over the public channel;

receiving, at the central server, a second user signal from the communicator at the client workstation to direct audio data from the audio device to the private channel;

providing via the central server, in response to the second user signal, a second encryption key to the client workstation, the second encryption key facilitating encryption of audio data to be transmitted between the client workstation and the second set of client workstations over the private channel; and switching, at the client workstation, between the first encryption key upon receipt of a termination request signal from the communicator to terminate transmission of audio data from the audio device to the private channel and the second encryption key upon receipt of a resume request signal from the communicator to resume transmission of audio data from the audio device to the private channel, the switching step being performed without the client workstation communicating with the central server so that latency perceived at the communicator is reduced.

9. The method according to claim 8, further comprising the step of assigning a first multicast address for transmission of multicast data between the first set of client workstations over the public channel.

10. The method according to claim 8, further comprising the step of delivering small amounts of in-band data to the first set of client workstations via the central server.

11. In a network interconnecting a central server having a memory and a plurality of client workstations adapted to broadcasting data, the broadcast data not going through the central server or any intermediary device controlled by the central server, a system for coordinating communication of data between each of the plurality of client workstations, comprising:

a device for receiving data at a first client workstation;

a first transmitter facilitating transmission of data from said device over a channel, said first transmitter being associated with a transmitter object stored in the memory of the central server, the transmitter object including a multicast address and an encryption key assigned to the transmitter;

a first receiver facilitating receipt of data over the channel at a second client workstation, said first receiver being associated with a receiver object stored in the memory of the central server, the receiver object including a multicast address and an encryption key assigned to the receiver;

a key manager providing a first encryption key to the first client workstation and the second client workstation for secure broadcast of data over the channel;

said key manager providing a second encryption key to the first client workstation and the second client workstation in response to creation of a second receiver object in the memory of the central server for a third client workstation, the second receiver object being associated with a second receiver, the second receiver being associated with the third client workstation, the second receiver object coordinating receipt of data over the channel by the second receiver at the third client workstation, the second encryption key facilitating secure broadcast of data over the channel from the first client workstation to the second client workstation and the third client workstation.

12. The system according to claim 11, further comprising a channel manager for managing a membership list associated with the channel.

13. The system according to claim 12, further comprising means for notifying said channel manager whenever the member of the channel changes.

14. The system according to claim 11, wherein the key manager provides a first multicast address.

15. In a networked computing environment interconnecting a plurality of client workstations and a central server, the plurality of client workstations communicating directly with the central server, each of the client workstations broadcasting data to sets of the plurality of client workstations, the broadcast data not going through the central server or any intermediary device controlled by the central server, a coordination system for providing dynamic interconnection of streams of data between each of the plurality of client workstations, the coordination system comprising:

an object database, resident in a memory of the central server, for storing a plurality of database objects, the object database storing therein a room object with a channel associated therewith;

a first user object being stored in the object database and having associated therewith a first client workstation, the first user object identifying a device for providing multimedia input at the first client workstation, the device directing multimedia input to a transmitter aiming at the channel;

a second user object being stored in the object database and having associated therewith a second client workstation, the second user object identifying a receiver directed at the channel for receiving data broadcast over the channel; and a key manager being stored in the object database and communicating with the first user object and the second user object, the key manager providing coordination information to enable the first user object and the second user object to broadcast data between the first client workstation and the second client workstation over the channel.

16. The coordination system according to claim 15, further comprising a channel manager, the channel manager notifying the key manager whenever the membership of the channel changes.

17. The coordination system according to claim 16, wherein the channel manager is associated with a database object.

18. The coordination system according to claim 15, wherein the coordination information includes a multicast address and an encryption key.

19. The coordination system according to claim 15, wherein the object database is shared and persistent.

20. The coordination system according to claim 19, wherein the object database includes a whiteboard object.

21. The coordination system according to claim 15, further comprising means for sending data to a client workstation through the central server.

* * * * *